2,879,298
PRODUCTION OF DIACETONE ALCOHOL

Robert B. Seligman, Richmond, Va., assignor to Philip Morris Incorporated, New York, N.Y., a corporation of Virginia No Drawing. Application May 29, 1957
Serial No. 662,323

4 Claims. (Cl. 260—594)

The present invention relates to an improved ketol condensation. More particularly, it relates to an improved method for the catalytic condensation of acetone (dimethyl ketone) to form high purity diacetone alcohol.

It is known to produce aldol condensation products from carbonyl compounds, in particular diacetone alcohol from acetone, by contacting the carbonyl compounds in the liquid state with granular condensation catalysts comprising a basic hydroxide, oxide, carbonate or oxychloride of a metal of groups I, II of the periodic table and there has been disclosed among others a catalyst produced by mixing hydrated lime, Portland cement, kieselguhr, sodium hydroxide, and water into a paste and granulating. However, this process is not entirely satisfactory, since the reaction velocity is rather low and the catalysts are not easily regeneratable.

According to the present invention aldol condensation products are produced from carbonyl compounds by bringing the carbonyl compound into contact in the liquid phase at a moderate temperature with a catalyst consisting essentially of activated alumina.

The process is of greatest value for production of high purity di-acetone alcohol from acetone. Di-acetone alcohol is useful as a solvent for nitrocellulose, cellulose acetate and many natural and synthetic resins, e.g., rosin, ester gum, kauri, copal and some alkyd and phenolic resins.

In producing di-acetone alcohol from acetone according to the invention, the temperature should not exceed 30° C. since above this temperature the equilibrium concentration of di-acetone alcohol in the mixture is so low that the process becomes uneconomic. While temperatures of from 0° C. to 30° C. are suitable, it is preferred on account of the greater reaction velocity achieved to employ a temperature of 10° C. to 25° C., preferably room temperature.

The process may be conducted in conventional apparatus, for example by passing the liquid carbonyl compound through a reactor containing one or more beds of catalyst. To reduce pressure drop and minimize catalyst carry-over in the product, it is preferred to use a granular catalyst and relatively low liquid velocity.

The process may be operated batchwise or continuously. It is preferred, however, to operate continuously. When operating continuously, a suitable liquid space velocity is up to one litre per litre of bulk catalyst volume per hour. Most frequently a liquid space velocity of about 0.5 litre/litre of bulk catalyst volume per hour is preferable. It is preferred to operate so that the catalyst is immersed in liquid, since if the liquid only trickles over the catalyst there is poor contact and lower efficiency. Satisfactory operation is accomplished by feeding the liquid to the top of a reactor and controlling the rate of withdrawal from the bottom thereof by means of a valve so that the catalyst is always covered.

The di-acetone alcohol may be separated from the product by flash distillation, whereby the bulk of the acetone is removed as distillate, followed by fractional distillation of the bottom product under reduced pressure. The unrectified acetone-free product is an exceptionally pure grade of di-acetone alcohol.

Activated alumina, which is the catalyst, is a recognized form of aluminum oxide. Generally activated alumina is prepared by precipitation of a hydrated form of aluminum oxide from an aluminum solution, then drying for activating the resultant gel at a temperature in the range of 400–800° C. In a generic sense, as herein intended, the term "activated alumina" has been recognized by the art—e.g. p. 645, 6, in volume 1 of the Kirk-Othmer Encyclopedia of Chem. Tech. (1947), published by Interscience. It should, however, be noted that variations in the method of preparation effect changes in the properties of activated alumina. In fact various grades are commercially available, and many studies into the aluminum oxide system have been reported, e.g. Patent 2,474,440.

As a prime characteristic, activated alumina suitable for the practice of this invention must have a mildly alkaline reaction. Thus if the activated alumina were slurried in 5–10 times as much by weight of water and a pH reading of the slurry taken, it should read within the pH 9–10 range. A more neutral or an acid pH activated alumina, e.g. acid washed before or after activation, is not suitable for the practice of this invention. At any rate, although any alkaline activated alumina is suitable for the practice of this invention, the Alcoa activated alumina grade known as F–20 is preferred. A typical analysis and properties of such an alumina are as follows:

| Chemical analyses, percent: | F-20 |
|---|---|
| $Al_2O_3$ | 92.00. |
| $Na_2O$ | 0.80. |
| $Fe_2O_3$ | 0.12. |
| $SiO_2$ | 0.09. |
| Loss on ignition (1100° C.) | 6.80. |
| Physical properties: | |
| Form | Granular. |
| Surface area, meters, 2 gm. | 210. |
| Bulk density, packad, # ft.³ | 68. |
| Bulk density, loose, # ft.³ | 58. |
| Screen analysis | Passes thru 80 mesh and retained on 200 mesh screens. |

The catalyst is preferably activated by washing with a suitable solvent such as ethanol, followed by thorough drying such as air drying and for alternatively oven drying at a temperature not exceeding 200° C. for 5 to 25 hours.

The following specific examples illustrate the practice of this invention.

A glass column (600 mm. high and 25 mm. diameter) was provided with a stopcock at the lower end and uniformly packed with Alcoa activated alumina (grade F–20) of the foregoing analysis and properties, to a height of 300 mm. Acetone was introduced at the top of this column and the flow adjusted so that the eluate emerged at the rate of 1 ml. per minute.

Example 1

One liter of commercial acetone [1] passed through the column produced 29.36 g. of acetone-free, crude, straw yellow material. This unrectified material had a refractive index of $N_D^{20} = 1.4245$ and $N_D^{17} = 1.4271$. The fifth edition of the Merck Index (p. 190) reports diacetone alcohol as $N_D^{20} = 1.4242$. The yield of crude was 3.0%. This material had a mass spectrometric pattern that compared with one obtained from Eastman's White Label ---
[1] Acetone, N. F. (Cat. #BA 1005) Baker & Adamson, General Chemical Division, Allied Chemical & Dye Corp., New York, N. Y.

4-hydroxy-4-methyl-2-pentanone (Cat. #1084). Ultraviolet examination of these same two samples showed more background material in the instant crude product. Infrared patterns of the two were almost identical; again a slight difference was noted in the background.

Example 2

A 500 ml. portion of this same acetone, using the same amount of alumina as above, produced a 3.25% yield of crude product.

Example 3

The spent alumina from Example 1 was washed with 200 ml. of 95% ethanol, by a batch process. (This produced 3.3 g. of additional material that was acetone-free. Its yellow color indicates that it is mainly higher polymer.) The alumina was air dried, then dried at 100° C. overnight (15 hours).

Passing a second liter of acetone through this catalyst, produced 28.4 g. of acetone-free product. This represents a 2.8% conversion to crude product.

Example 4

The spent alumina from Example 2 was regenerated in a slightly different manner. Two hundred ml. of 95% ethanol percolated down the column emerging at the rate of 1 ml./min. After that, the alumina was removed, air dried, then oven dried at 123° C. for 15 hours.

Passing a second 500 ml. portion of acetone through this column produced 21.1 g. of acetone-free, crude product. This represents a 4.2% yield.

Example 5

The regenerated alumina used in Example 4 was used again. Two additional 500 ml. portions of acetone were put through the column without regeneration, but permitting the column to "go dry" between runs. The third portion of acetone showed a 4.0% conversion to crude product.

Example 6

Technical grade propionaldehyde (Eastman Cat. #T653) was used in lieu of acetone in the column. A 500 ml. portion produced 24.2 g. of a dark yellow, viscous crude. This is a 4.8% yield. Mass spectrometric analysis showed this to be propionaldol, in part, and the balance higher polymers of propionaldehyde.

In the foregoing Examples 1–5 the conversion of commercial acetone on the column is approximately 4%, based on the weight of acetone-free, non-rectified product. This di-acetone alcohol product exhibits a mass spectrum and an infrared spectrum that is almost identical with a known sample of di-acetone alcohol (Eastman White Label) and has a refractive index that is very close to that recorded in the literatures: found, $N_D^{20}=1.4245$; literature value, $N_D^{20}=1.4242$. Thus, this "crude" is a fairly pure material.

The process of the invention is also applicable to methyl ethyl, methyl propyl, and methyl isopropyl, ketones, which yield respectively: 3-methyl heptan-3-ol-5-one and 3,4-dimethyl hexan-3-ol-5-one; 4-methylnonan-4-ol-6-one and 4-methyl-5-ethyl heptan-4-ol-6-one; and 2,3,6-trimethyl heptan-3-ol-5-one and 2,3,4,5-tetramethyl hexan-3-ol-5-one. Similar conditions to those mentioned above are suitable.

I claim:
1. A continuous process for the production of aldol condensation products which comprises bringing a member selected from the group consisting of aldehydes and ketones into contact in the liquid phase at a temperature of from 0–30° C. with an activated alumina having a mildly alkaline pH.

2. A process for the production of di-acetone alcohol which comprises bringing acetone into contact in the liquid phase at a temperature of from 0–30° C. with an activated alumina having a mildly alkaline pH.

3. The process of claim 2 where the activated alumina imparts a pH in the range of pH 9–10 to a slurry containing from 5–10 parts by weight of water per part of activated alumina.

4. The process of claim 2 wherein the activated alumina is regenerated by extraction with ethanol followed by thorough drying.

References Cited in the file of this patent
UNITED STATES PATENTS

| | | |
|---|---|---|
| 2,130,592 | McAllister et al. | Sept. 20, 1938 |
| 2,800,510 | Miller | July 23, 1957 |